US012702876B2

(12) United States Patent
Wang et al.

(10) Patent No.: US 12,702,876 B2
(45) Date of Patent: Aug. 11, 2026

(54) INTEGRATED PERSONAL PROTECTIVE EQUIPMENT CONNECTOR ELEMENT FOR USE WITH A WEARABLE SAFETY HARNESS

(71) Applicant: HONEYWELL SAFETY PRODUCTS USA, INC., Charlotte, NC (US)

(72) Inventors: Wenbo Wang, Shanghai (CN); Ling Lin, Shanghai (CN); Xiaojuan Zhu, Shanghai (CN); Zheng Gu, Shanghai (CN); Lyndon Liu, Shanghai (CN); Peng Zhou, Shanghai (CN)

(73) Assignee: Honeywell Safety Products USA, Inc., Latham, NY (US)

( * ) Notice: Subject to any disclaimer, the term of this patent is extended or adjusted under 35 U.S.C. 154(b) by 1309 days.

(21) Appl. No.: 17/463,180

(22) Filed: Aug. 31, 2021

(65) Prior Publication Data

US 2023/0026773 A1 Jan. 26, 2023

(30) Foreign Application Priority Data

Jul. 23, 2021 (CN) ........................ 202110836502.8

(51) Int. Cl.
*A62B 35/00* (2006.01)

(52) U.S. Cl.
CPC ...... *A62B 35/0037* (2013.01); *A62B 35/0018* (2013.01)

(58) Field of Classification Search
CPC ............ A62B 35/0025; A62B 35/0018; A62B 35/0037; A62B 35/0006; A62B 35/0031; A62B 35/04
See application file for complete search history.

(56) References Cited

U.S. PATENT DOCUMENTS 6,592,310 B2 * 7/2003 Hyp ...................... B60P 7/0807 296/65.13
9,427,608 B2 8/2016 Fink et al.
(Continued)

FOREIGN PATENT DOCUMENTS

WO 2021/099940 A1 5/2021

OTHER PUBLICATIONS

EP Application No. 21194587.8, EESR mailed Feb. 21, 2022, 9 pgs.

*Primary Examiner* — Abe Massad
(74) *Attorney, Agent, or Firm* — Fredrikson & Byron, P.A.

(57) ABSTRACT

Various embodiments are directed to backplates comprising a base portion attached to a strap of the wearable safety harness; and a connector element secured relative to the base portion and comprising a first safety device interface configured to engage a first safety device so as to couple the first safety device to the backplate. In various embodiments, the connector element is selectably detachable from the base portion. In various embodiments, the connector element comprises a second safety device interface configured to engage a second safety device so as to couple the second safety device to the backplate. In various embodiments, the connector element operably secures both the first safety device and the second safety device relative to the base portion. In various embodiments, the connector element operably secures a first safety device comprising a personal fall limitor and a second safety device comprising a D-ring relative to the base portion.

16 Claims, 7 Drawing Sheets

(56) References Cited

U.S. PATENT DOCUMENTS

| | | | | |
|---|---|---|---|---|
| 2016/0361577 | A1 | 12/2016 | Perner et al. | |
| 2019/0001165 | A1 | 1/2019 | Schurian et al. | |
| 2019/0329077 | A1 | 10/2019 | Carrasca et al. | |
| 2020/0129790 | A1 * | 4/2020 | Stephenson ........ | A62B 35/0025 |
| 2020/0155879 | A1 * | 5/2020 | Chang ................ | A62B 35/0037 |
| 2020/0230445 | A1 | 7/2020 | Auston et al. | |
| 2022/0080233 | A1 * | 3/2022 | Safe ................... | A62B 35/0037 |

* cited by examiner

INTEGRATED PERSONAL PROTECTIVE EQUIPMENT CONNECTOR ELEMENT FOR USE WITH A WEARABLE SAFETY HARNESS

CROSS-REFERENCE PARAGRAPH

This application claims priority from Chinese Application Number 202110836502.8, filed on Jul. 23, 2021, and entitled "Integrated Personal Protective Equipment Connector Element For Use With A Wearable Safety Harness," which is incorporated herein by reference in its entirety.

FIELD OF THE INVENTION

Various embodiments described herein relate generally to safety equipment or personal protective equipment (PPE), including full body harnesses, which may be used by first responders, other users who work on platforms situated at a height, and/or the like.

BACKGROUND

Safety harnesses are commonly used as part of a fall protection system for users subjected to the potential of a fall from a height. In some environments, full-body safety harnesses are used, in some examples, when working on platform including an elevated surface positioned at a height of six feet or greater. Wearable safety harnesses including a plurality of straps that collectively define both an upper torso portion (having, for example, shoulder straps) and a lower torso or seat portion (having, for example, one or more leg straps and/or a seat strap) may be secured to one or more safety system components in order to at least partially mitigate the bodily harm realized by a user as a result of a fall occurrence. Various PPE may be secured relative to a harness in order to operably couple a user of the harness relative to one or more anchor points. Installation of the PPE relative to the harness may be both difficult and time-consuming, often requiring a user to take off the harness in order for the harness component configured to receive the various PPE to be installed. In addition, various PPE may be inoperable with a particular harness, as harnesses may be configured for accommodating PPE of a single size, type, and/or the like. Further, upon a PPE component being secured relative to the harness and as the user moves about the elevated surface, the configuration of the plurality of straps defining the harness and any PPE operatively secured relative to the harness may intersect, tangle, rub, or otherwise hinder movement of a user.

Accordingly, a need exists for improved wearable harnesses, including improved connector elements characterized by increased mobility and user comfort, a simplified installation operation, minimized product costs, minimized product failure caused by wear and/or damage to the harness at the connector element, and a maximization of product operability across a variety of different PPE configurations. Through applied effort, ingenuity, and innovation, Applicant has solved many of these identified problems by developing solutions embodied in the present disclosure, which are described in detail below.

BRIEF SUMMARY

Various embodiments are directed to backplates for use with a wearable safety harness and methods of using the same. In various embodiments, a backplate may comprise a base portion operable to attach to one or more straps of the wearable safety harness; and a connector element comprising: a first safety device interface configured to engage a first safety device so as to operatively couple the first safety device to the backplate; and a second safety device interface configured to engage a second safety device so as to operatively couple the second safety device to the backplate; wherein the connector element is selectably detachable from the base portion.

In various embodiments, the connector element may further comprise a second safety device interface configured to engage a second safety device so as to operatively couple the second safety device to the backplate. In certain embodiments, the first safety device may comprise one of a fall protection lanyard, a self-retracting lifeline, a personal fall limitor, and a carabiner, and wherein the second safety device comprises a D-ring. In certain embodiments, the first safety device interface may comprise a first hollow channel configured to receive at least a portion of the first safety device therein so as to at least partially secure the first safety device relative to the connector element; and wherein the second safety device interface comprises a second hollow channel configured to receive at least a portion of the second safety device therein so as to at least partially secure the second safety device relative to the connector element. Further, in certain embodiments, the first safety device interface may extend laterally along a first width portion of the connector element; and wherein the second safety device interface extends laterally along a second width portion of the connector element.

In various embodiments, the connector element may further comprise one or more retention features disposed at least substantially adjacent the second safety device interface and configured to apply a pressing force to at least part of the second safety device when the second safety device defines an installed configuration relative to the second safety device interface, wherein the applied pressing force is configured to at least partially counteract one or more external forces so as to maintain the second safety device in an at least substantially upright position. Further, in various embodiments, the first safety device interface may be operable to engage a plurality of first safety devices so as to facilitate attachment of each of the plurality of first safety devices relative to the connector element via a corresponding plurality of sequential attachment operations; the plurality of first safety devices being defined by a plurality of respective attachment portions having a plurality of distinct dimensional configurations. In certain embodiments, the plurality of respective attachment portions that the first safety device interface is operable to engage may include one or more of a G2 connector, a G3 connector, and an LE Turbolite connector.

In various embodiments, the connector element may further comprise one or more attachment arm recess configured such that at least part of an attachment portion of the first safety device extends from the first safety device interface through one or more attachment arm recess when the first safety device defines an installed configuration relative to the first safety device interface. In certain embodiments, the connector element may further comprise a third safety device interface configured to engage a third safety device so as to operatively couple the third safety device to the backplate. In various embodiments, the connector element may further comprise an eyelet extending from an exterior surface of the connector element in an outward direction and configured to receive at least a portion of the one or more straps of the wearable safety harness within an interior eyelet area. In various embodiments, the first safety device interface may extend along a central axis that positioned between the base portion and the eyelet.

Various embodiments described herein are directed to a backplate for use with a wearable safety harness, the backplate comprising a base portion operable to attach to one or more straps of the wearable safety harness; and a connector element defined by one or more connection features fixedly secured relative to the base portion, connector element comprising: a first safety device interface configured to engage a first safety device so as to operatively couple the first safety device to the backplate; and a second safety device interface configured to engage a second safety device so as to operatively couple the second safety device to the backplate.

In various embodiments, the first safety device may comprise one of a fall protection lanyard, a self-retracting lifeline, a personal fall limitor, and a carabiner, and wherein the second safety device comprises a D-ring. In various embodiments, the first safety device interface may comprise a first hollow channel configured to receive at least a portion of the first safety device therein so as to at least partially secure the first safety device relative to the connector element; and wherein the second safety device interface comprises a second hollow channel configured to receive at least a portion of the second safety device therein so as to at least partially secure the second safety device relative to the connector element.

In certain embodiments, the second safety device interface may comprise one or more apertures extending through an exterior surface of the second hollow channel, the one or more apertures having an at least partially compressible configuration so as to facilitate an at least partially flexible configuration of the second safety device interface defined by a range of relative lateral motion between a first interface portion and a second interface portion of the second safety device interface. In certain embodiments, the first safety device interface may be operable to engage a plurality of first safety devices so as to facilitate attachment of each of the plurality of first safety devices relative to the connector element via a corresponding plurality of sequential attachment operations; the plurality of first safety devices being defined by a plurality of respective attachment portions having a plurality of distinct dimensional configurations. Further, in certain embodiments, the plurality of respective attachment portions that the first safety device interface is operable to engage may include one or more of a G2 connector, a G3 connector, and an LE Turbolite connector.

In various embodiments, the connector element may further comprise one or more attachment arm recess configured such that at least part of an attachment portion of the first safety device extends from the first safety device interface through one or more attachment arm recess when the first safety device defines an installed configuration relative to the first safety device interface. In various embodiments, the connector element may further comprise one or more retention features disposed at least substantially adjacent the second safety device interface and configured to apply a pressing force to at least part of the second safety device when the second safety device defines an installed configuration relative to the second safety device interface, wherein the applied pressing force is configured to at least partially counteract one or more external forces so as to maintain the second safety device in an at least substantially upright position.

BRIEF DESCRIPTION OF THE DRAWINGS

Reference will now be made to the accompanying drawings, which are not necessarily drawn to scale, and wherein.

DETAILED DESCRIPTION

Figure 1:
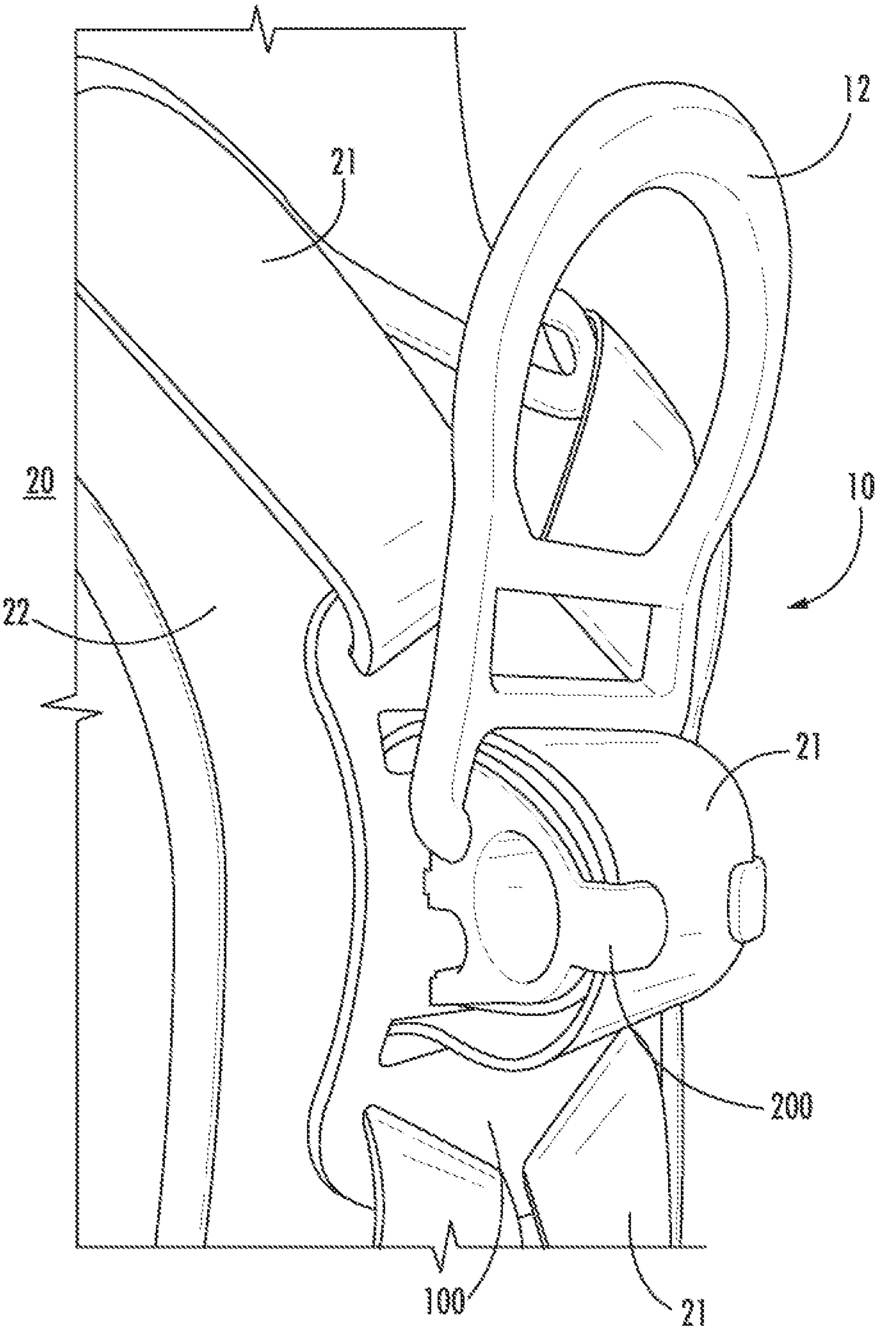
FIG. 1 illustrates a perspective view of a wearable safety harness comprising an exemplary backplate according to an example embodiment described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

The term "strap" refers to an elongated flap or a flat strip comprising a material having flexibility characteristics. Example material may include, but not limited to, nylon, polyester, synthetic fiber, and/or the like. In some examples, an example strap may connect, fasten, and/or secure various parts of an example harness, and/or may support body portion(s) of a wearer of the example harness. In some examples, an example strap of an example harness may be referred in connection with an example placement of the strap when the example harness is worn by a user. For example, an example leg strap of an example harness may be placed on a leg portion of a wearer of the example harness.

Various embodiments described herein are directed to backplates for use with a wearable safety harness comprising a base portion and a specifically configured connector element comprising a first safety device interface configured to engage a first safety device so as to operatively couple the first safety device to the backplate. The connector element may be selectably detachable from the base portion so as to facilitate ease of use and interoperability amongst different users (e.g., wearers) by enabling a user's detachment from and/or fastening to a safety device without requiring a user to remove, deconstruct, or otherwise reconfigure a safety harness being worn by the user.

Further, various embodiments described herein are directed to backplates for use with a wearable safety harness comprising a base portion and a specifically configured connector element comprising: a first safety device interface configured to engage a first safety device so as to operatively couple the first safety device to the backplate and a second safety device interface configured to engage a second safety device so as to operatively couple the second safety device to the backplate. The present invention provides an integrated means of securing both a first safety device comprising a self-retracting lifeline (SRL), a personal fall limitor (PFL), a carabiner, and/or the like and a second safety device comprising a D-ring relative to an exemplary backplate using a first safety device interface and a second safety device interface, respectively, that are provided about the connector element. Backplates configured as described herein a particularly preferred when compared to a backplate configured to facilitate direct coupling of only one safety device, such as, for example, a D-ring, which may require additional hardware elements in order to attach additional safety devices that can cause physical obstructions that can cause undesirable wear and limit user flexibility and/or range of motion during use.

FIG. 1 illustrates a perspective view of an exemplary connector element as described herein according to an exemplary embodiment. In particular, FIG. 1 illustrates a perspective view of a wearable safety harness comprising an exemplary backplate configured for operatively securing at least one safety device relative to the wearable safety harness. In various embodiments, an item of personal protective equipment (PPE) for providing fall protection is shown as a piece of fall protection equipment (FPE) in the form of a wearable safety harness for use in fall protection, such as, for example, a wearable safety harness 20. In various embodiments, a wearable safety harness 20 may comprise a full-body safety harness configured to be worn by a user. For example, an exemplary wearable safety harness 20 may be a full-body harness comprising a plurality of straps 21 configured to secure a user within the harness 20, such as, for example, by attaching the harness 20 to the user, and, further, to facilitate an attachment of the wearable safety harness 20 to other fall protection equipment. In various embodiments, the wearable safety harness 20 may be configured for coupling to one or more safety devices, such as, for example, a fall protection device, configured to at least substantially mitigate and/or minimize bodily harm realized by a user in the event of a fall, as described herein. As non-limiting examples provided for purposed of illustration, in various embodiments, a safety device may be a D-ring, an anchor, a fall protection lanyard, a self-retracting lifeline (SRL), a personal fall limitor (PFL), a carabiner, and/or the like that may be secured relative to at least a portion of a wearable safety harness 20. It should be understood that many types and configurations of safety/fall harnesses are known in the PPE and FPE industry, including full body harnesses and partial or hip/waist fall harnesses, all, or most, of which are suitable for use with the concepts disclosed herein. Accordingly, the wearable safety harness 20 depicted in FIG. 1 is provided for purposes of illustration and further specific details of the harness 20 will not be discussed herein except for those required for an understanding of the disclosed concepts, and that the appended claims are not limited to any specific details of a fall harness unless expressly recited in the claims.

In various embodiments, at least a portion of the plurality of straps 21 of a wearable safety harness 20 may further engage a back pad 22 of a wearable safety harness 20 such that the straps 21 may be attached to the back pad 22, for example, via corresponding looped strap portions retained by the back pad 22. The straps 21 engaged with the back pad 22 may maintain the back pad 22 in a position at least substantially adjacent a back portion of a user's body when the user is wearing the wearable safety harness 20. For example, a back pad 22 may comprise material having shock-absorbing characteristics, including, but not limited to, cotton, polymers, silicon, and/or the like.

Further, in various embodiments, a wearable safety harness 20 may further comprise a backplate 10 configured to facilitate the operative coupling of at least one safety device relative to at least a portion of the wearable safety harness 20. As illustrated, in various embodiments, a backplate 10 may engaged by at least a portion of the plurality of straps 21 such that the straps 21 engaged with the back pad 22, such as, for example, via corresponding looped strap portions retained by the back pad 22, may maintain the back pad 22 in a position at least substantially adjacent a back portion of a user's body when the user is wearing the wearable safety harness 20. For example, the straps 21 operatively attached to the backplate 10 may be configured to retain the backplate 10 in a position at least substantially adjacent the back pad 22.

As described herein, an exemplary backplate 10 may be configured to operatively secure at least one safety device to the wearable safety harness 20. As illustrated and described in further detail herein, a backplate 10 may comprise a base portion 100 operable to attach to at least a portion of the wearable safety harness 20, such as, for example, one or more of the plurality of straps 21, and a connector element 200 secured relative to the base portion 100 and configured to receive at least a portion of a safety device so as to operatively couple the safety device to the backplate 10. For example, in various embodiments, an exemplary backplate 10 may be configured to receive and/or engage a safety device using a connector element 200 configured to retain the safety device in an installed configuration relative to the backplate 10 using one or more connection features disposed about the connector element 200. Further, as described herein, in various embodiments, an exemplary backplate 10 may be configured to receive and/or engage a plurality of safety devices using a connector element 200 configured to retain each of the plurality of safety devices in an installed configuration relative to the backplate 10 using a respective connection feature positioned about the connector element 200.

As a non-limiting example illustrated in FIG. 1, in various embodiments, a backplate 10 of an exemplary safety harness 20 may be configured to receive a safety device comprising a D-ring 12. A D-ring 12 may be in a shape similar to a capitalized letter D in the English alphabet, and may comprise material having sturdy characteristics, such as, but not limited to, nickel, brass, zinc, steel, and/or the like. For example, a D-ring 12 attached to a backplate 10 of an exemplary safety harness 20 in an installed configuration may be further connected to one or more additional safety devices, such as, for example, a fall protection lanyard, an SRL, and/or the like, that may in turn be connected to an anchorage, so as to at least partially tether the wearable safety harness 20 to the anchorage via the backplate 10 (e.g., via the connector element 200). As illustrated in FIG. 1, the D-ring 12 secured relative to the backplate 10 of an exemplary safety harness 20 in an installed configuration via the connector element 200 is arranged in an at least substantially upright position defined by the D-ring extending in an outward direction away from the connector element 200 within a plane that is at least substantially parallel with a back portion of the body of a user wearing the safety harness 20 to which the D-ring is secured (e.g., via the connector element 200). As described in further detail herein, an exemplary backplate 10 may be configured such that a D-ring operatively coupled thereto (e.g., via a connector element 200) may be maintained in an at least substantially upright position throughout a use of the wearable safety harness 20.

Figure 2:
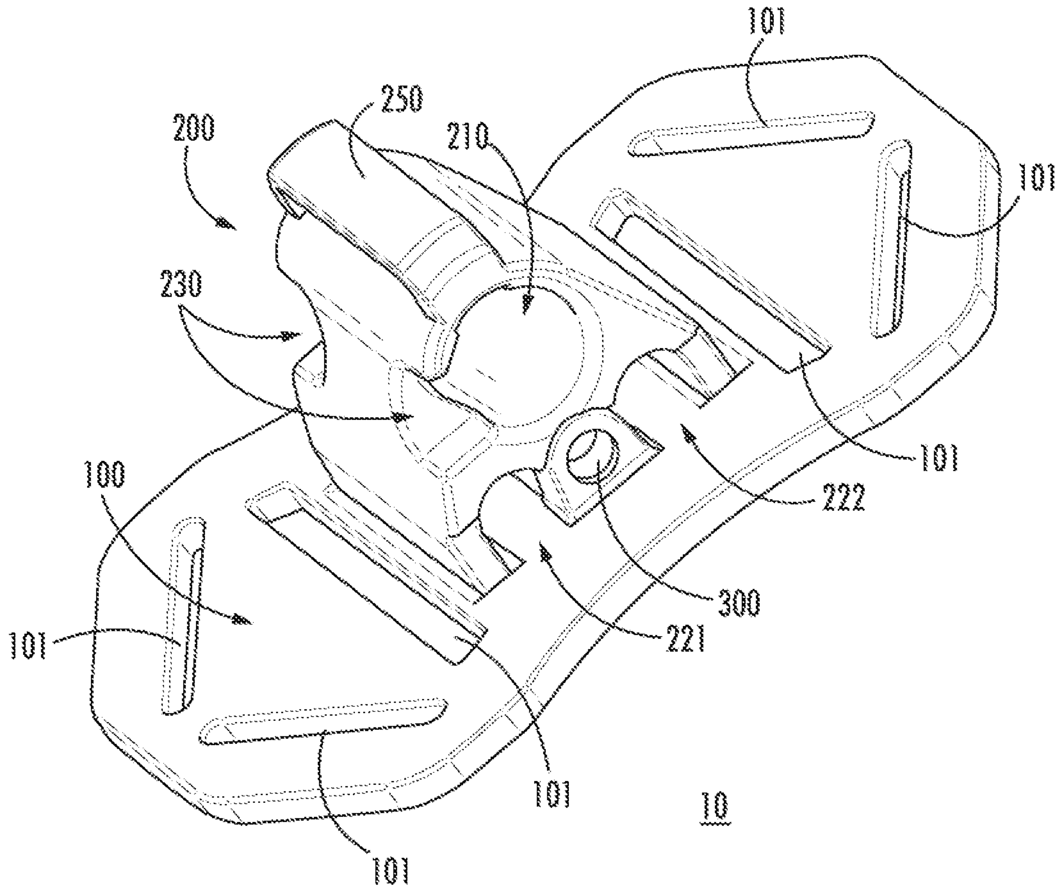
FIG. 2 illustrates a perspective view of an exemplary backplate according to an example embodiment described herein.

FIG. 2 illustrates a perspective view of an exemplary relief apparatus according to an example embodiments. In particular, FIG. 2 shows an exemplary backplate, according to various embodiments, that is operable to secure a plurality of safety devices relative to a wearable safety harness. As illustrated, an exemplary backplate 10 may comprise a base portion 100 comprising a material component that may be defined at least in part by a material thickness and may extend in an at least substantially planar direction. In various embodiments, a base portion 100 may comprise one or more materials having sturdy characteristics such that the base portion 100 may be at least partially resistance to inelastic deformation caused by a particular weight, pulling force, and/or the like acting thereon, and may resist fracturing when such a force is applied thereto.

In various embodiments, the base portion 100 may be operable to attach to at least a portion of a wearable safety harness, such as, for example, via a secured arrangement of at least one of the plurality of straps through one or more of the base openings 101 extending through the thickness of the base portion 100 with one or more of the plurality of straps. For example, an example base portion 100 may comprise a plurality of base openings 101, each of which may be configured to receive at least a portion of a strap therethrough. In such an exemplary circumstance, a strap portion provided within a base opening may be stitched back on the example strap, thereby creating one or more loops that are secured relative to the base portion 100 of the backplate 10. In various embodiments, an exemplary base portion 100 may comprise an at least substantially planar component that may be secured relative to a portion of a wearable safety harness that is at least substantially adjacent a back portion of a user's body when the user is wearing the wearable safety harness.

As further illustrated in FIG. 2, in various embodiments an exemplary backplate 10 may comprise a connector element 200 secured relative to the base portion 100 and configured such that one or more safety devices may be attached thereto in order to facilitate a coupling of the one or more safety devices to the wearable safety harness (e.g., to the backplate 10). In various embodiments, an exemplary a connector element 200 may comprise at least one connection feature positioned about the connector element 200 and configured to receive and/or engage at least a portion of a safety device so as to operably secure the safety device relative to the backplate 10 (e.g., via the connector element 200), as described in further detail herein.

Figure 3:
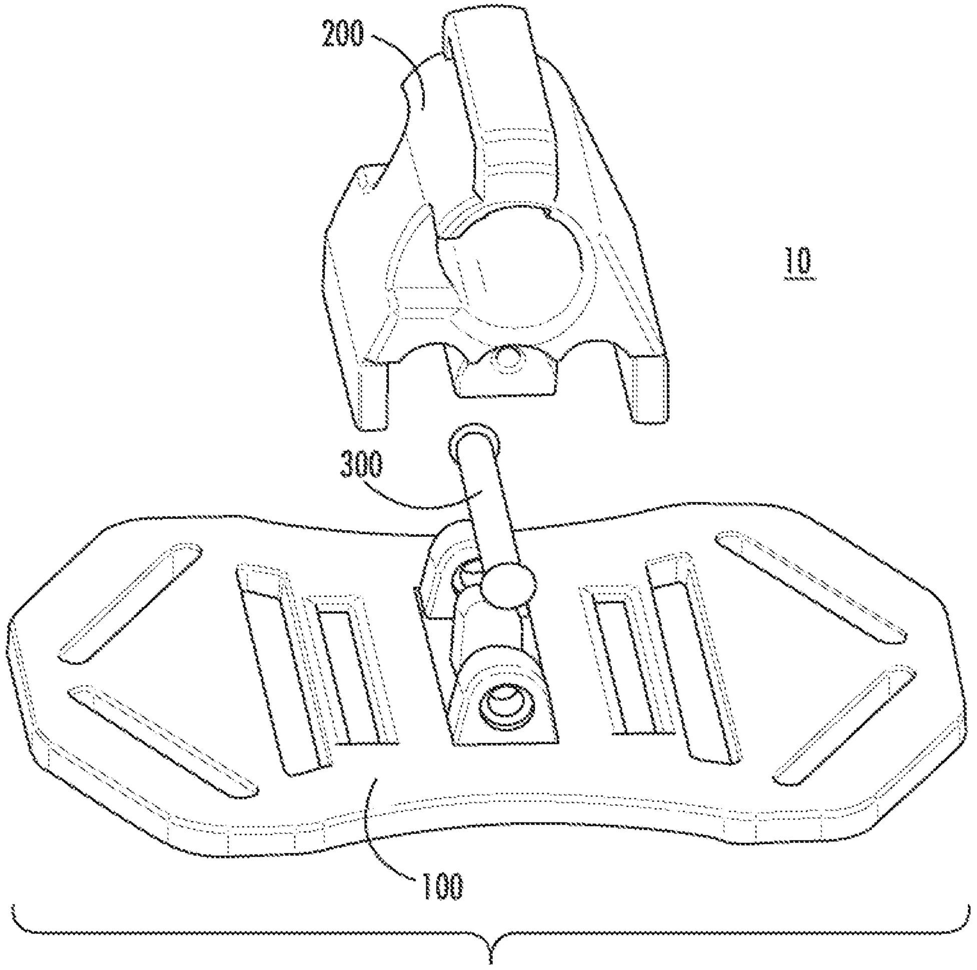
FIG. 3 illustrates an exploded perspective view of an exemplary backplate according to an example embodiment described herein.

In various embodiments, a connector element 200 may be disposed about a surface of the base portion 100 such that the connector element 200 (e.g., a height of the connector element 200) extends in an outward direction away from the surface of the base portion 100 engaged therewith. at least substantially permanently secured to base portion 100 such that the connector element 200 and the base portion 100 collectively define a singular component. In various embodiments, the connector element 200 may be either fixedly secured relative to the base portion 100 or, alternatively, selectively detachable from the base portion 100. For example, in various embodiments, a connector element 200 may be at least substantially permanently secured to base portion 100 such that the connector element 200 and the base portion 100 collectively define a singular component. Further, in various embodiments, as illustrated in FIG. 3, the connector element 200 may comprise a detachable configuration in which the base portion 100 and the connector element 200 are physically distinct components of backplate 10 such that the connector element 200 may be selectively detachable from the base portion 100 as the base portion 100 remains attached to the one or more straps of the wearable safety harness (e.g., via base openings 101). FIG. 3 illustrates an exploded perspective view of an exemplary backplate according to an example embodiments. As illustrated, in various embodiments, the connector element 200 may be removably secured relative to the base portion 100 via one or more fastening means, such as, for example, hook and loop fasteners, snaps, buttons, zippers, magnets, and/or the like. As illustrated, connector element 200 may be secured to base portion 100 using an attachment pin 300 configured to extend through corresponding portions of the base portion 100 and the connector element 200 so as to operably couple the connector element 200 to the base portion 100 by at least substantially minimizing a range of relative motion between the connector element 200 and the base portion 100 in one or more directions.

Figure 4A:
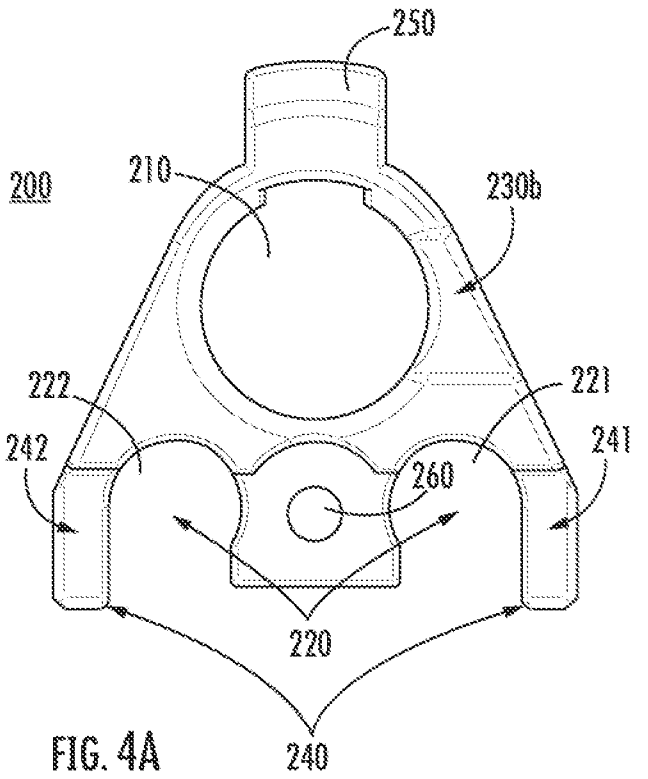
FIGS. 4A-4D illustrate various views of an exemplary backplate according to an example embodiment described herein.
Figure 4B:
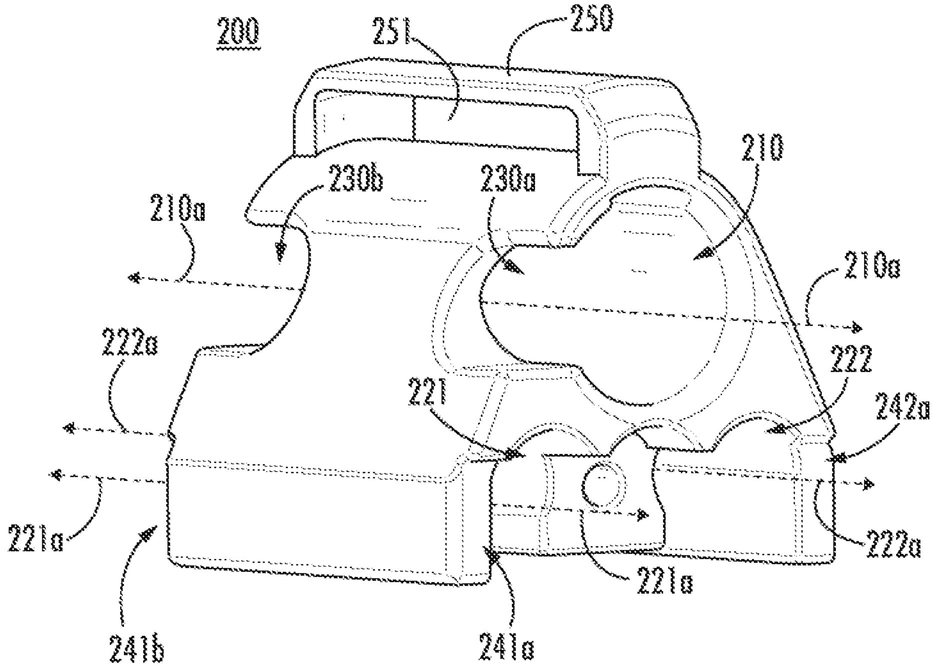
Figure 4C:
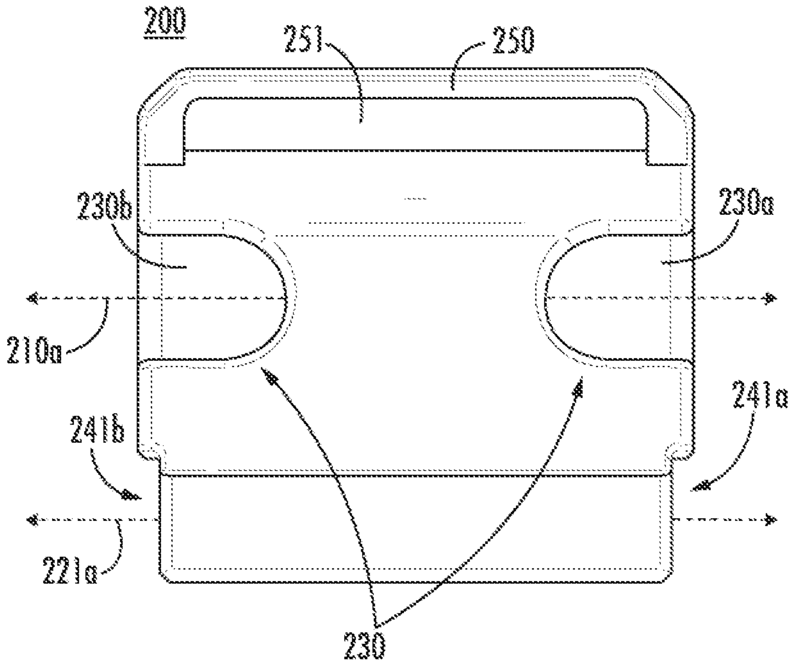
Figure 4D:
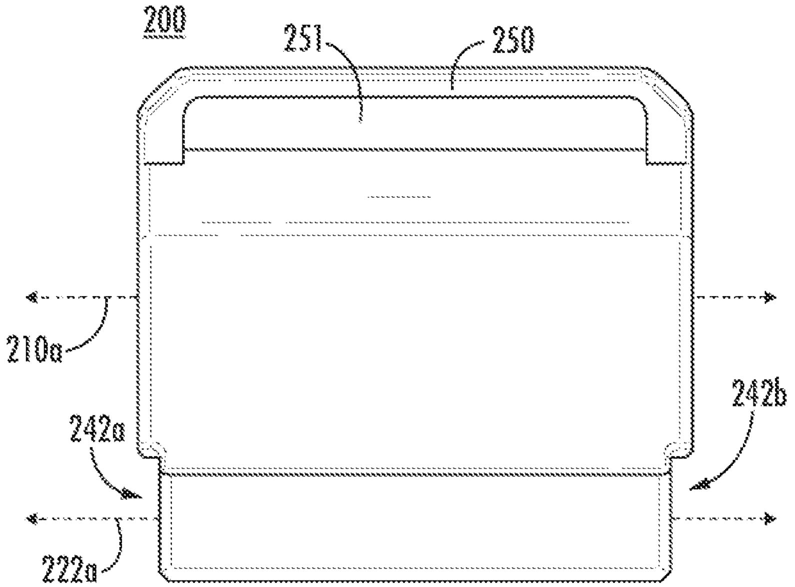

FIGS. 4A-4D illustrate various views of an exemplary connector element according to an embodiment described herein. In particular, FIG. 4A shows a side view of an exemplary connector element, FIG. 4B shows a perspective view of the exemplary connector element, FIG. 4C shows a bottom view of the exemplary connector element, and FIG. 4D shows a top view of the exemplary connector element according to various embodiments described herein. As described above, in various embodiments, an exemplary connector element 200 may comprise at least one connection feature positioned about the connector element 200 and configured to receive and/or engage at least a portion of a safety device so as to operably secure the safety device relative to the backplate 10 (e.g., via the connector element 200). In various embodiments, a connection feature defined by the connector element 200 may comprise a cylindrical channel extending laterally along at least a portion of a width of the connector element 200 about a central axis thereof. For example, as illustrated in FIGS. 4A-4D, connector element 200 comprises a connection feature comprising a first safety device interface 210 extending along first interface axis **210*a* that is configured to receive and/or engage at least a portion of a first safety device in order to operably couple the first safety device relative to an exemplary backplate 10**.

In various embodiments, a safety device may comprise an attachment portion defined at least in part by one or more fastener means, such that the safety device may be secured relative to the backplate (e.g., via the connector element 200) when at least a portion of the attachment portion of the safety device is secured at a safety device interface of the connector element 200. For example, a first safety device may comprise an attachment portion defined at least in part by one or more fastener means, wherein the first safety defines an installed configuration relative to the backplate when at least a portion of the attachment portion of the first safety device is secured at the first safety device interface 210. In various embodiments, an attachment portion of a safety device may comprise a hook, a linear pin, a carabiner, and/or the like. As non-limiting examples, in an exemplary circumstance wherein a first safety device comprises an SRL, PFL, and/or the like, an attachment portion of the first safety device may be defined by a G2 connector, a G3 connector, an LE Turbolite connector, and/or the like.

As illustrated in the exemplary embodiment shown at FIG. 4A-4D, wherein the connector element 200 comprises a first safety device interface 210 comprising a hollow interface channel defined by an interior surface diameter and a first interface axis 210*a* extending along a width of the connector element 200 between opposing first and second lateral sides thereof, the first safety device interface 210 may facilitate a coupling of the first safety device to the backplate based on at least a portion of the first safety device, such as, for example, an attachment portion of the first safety device, being received and/or secured within the first safety device interface 210. The connector element 200 may retain the first safety device in an installed configuration by at least partially restricting the range of motion of the portion of the first safety device disposed within the first safety device interface 210 (e.g., an attachment portion) in one or more directions. For example, an exemplary first safety device may comprise an attachment portion defined at least in part by a substantially linear element (e.g., a pin) that may be provided within the hollow interior channel defining the first safety device interface 210. As illustrated, in various embodiments, the first safety device interface 210 may be positioned about the connector element 200 such that first interface axis 210*a* of the first safety device interface 210 is positioned a perpendicular distance away from the base portion of the backplate.

In various embodiments, a first safety device interface 210 may be defined at least in part by an interior surface diameter that is specifically dimensioned such that the first safety device interface 210 may accommodate each of a variety of distinctly configured and/or dimensioned first safety devices (e.g., attachment portions thereof). In various embodiments, the first safety device interface 210 may comprise an interior surface diameter that is at least substantially between 0.75 inches and 1.00 inch (e.g., between 0.82 inches and 0.93 inches). Further, in various embodiments, the first safety device interface 210 may comprise an interior surface diameter that is either at least substantially uniform or, alternatively, variable at one or more locations along the first safety device interface 210. As such, the first safety device interface 210 of the connector element 200 is operable to receive first safety devices having an attachment portion defined by one of a plurality of industry-standard fastening means, such as, for example, a G2 connector, a G3 connector, an LE Turbolite connector, and/or the like. As a non-limiting example provided for illustrative purposes, a first safety device interface 210 may be configured to, in separate coupling instances, accommodate each of a G2 connector having a linear element with a cross-sectional diameter of at least approximately 12 mm, a G3 connector having a linear element with a cross-sectional diameter of at least approximately 21 mm, and an LE Turbolite connector having a linear element with a cross-sectional diameter of at least approximately 11 mm.

In various embodiments, a connector element 200 may further comprise one or more attachment arm recesses 230 disposed at least substantially adjacent the first safety device interface 210 about a first lateral side and/or a second lateral side of the connector element 200. For example, as illustrated in FIGS. 4B and 4C, a connector element 200 may further comprise a plurality of attachment arm recesses 230 disposed at least substantially adjacent the first safety device interface 210, including a first attachment arm recess 230*a* and a second attachment arm recess 230*b* positioned about the first lateral side and the second lateral side of the connector element 200, respectively. In various embodiments, an attachment arm recess 230 may comprise an opening, notch, slot, any similar material recess and/or the like configured to extend into the first safety device interface 210 and positioned at least substantially adjacent a lateral end of the first safety device interface 210. In various embodiments, the one or more attachment arm recesses 230 of the connector element 200 may be configured such that, in an exemplary circumstance wherein a first safety device is operatively attached to the connector element 200 via an attachment portion that is secured within the first safety device interface 210, at least part of the attachment portion of the first safety device defining an installed configuration may extend through the one or more attachment arm recesses 230 (e.g., through each of first attachment arm recess 230*a* and second attachment arm recess 230*b*, respectively).

For example, in various embodiments, a safety device may comprise an attachment portion that is defined at least in part by a non-linear profile, such as, for example, a substantially "U"-shaped profile defined by one or more arm elements extending away from a substantially linear element of the attachment portion. For example, various safety devices having attachment portions defined by a carabiner, such as, for example, an LE Turbolite connector, may have an at least partially non-linear profile defined by one or more arm elements positioned about a lateral end of a linear element and extending in a direction away from a central axis of the linear element. In various embodiments, the one or more attachment arm recesses 230 may provide additional clearance for a first safety device having an at least partially non-linear attachment portion, such that the connector element 200 may receive a non-linear attachment portion of the first safety device within the first safety device interface 210 while avoiding undesirable physical interference between the first safety device and the connector element 200 that may otherwise be generated as a result of the non-linear and/or incompatible profile of the attachment portion of the first safety device. In various embodiments, the one or more attachment arm recesses 230 may comprise a width of at least substantially between 0.25 inches and 0.75 inches (e.g., between 0.40 inches and 0.60 inches), and a length of at least substantially between 0.35 inches and 0.85 inches (e.g., between 0.50 inches and 0.70 inches). As illustrated in FIG. 4A-4C, the connector element 200 comprising one or more attachment arm recesses 230 may be configured to accommodate an installed configuration of such an exemplary first safety device having an at least partially non-linear attachment portion, such as, for example, an LE Turbolite connector, by arranging the one or more arm elements of the attachment portion respectively within the one or more attachment arm recesses 230.

In various embodiments, an exemplary a connector element 200 may comprise a plurality of connection features positioned about the connector element 200, each configured to receive and/or engage at least a portion of a respective safety device so as to operably secure the respective safety device relative to the backplate (e.g., via the connector element 200). In such an exemplary embodiment, the connector element 200 may be configured to operably secure each of a plurality of safety devices relative to the backplate via the plurality of connection features positioned thereabout. In various embodiments, a plurality of connection features may comprise a first safety device interface 210 operable to secure a first safety device relative to the connector element 200 and a second safety device interface 221 operable to secure a second safety device relative to the connector element 200.

In various embodiments, a second safety device interface 221 defined by the connector element 200 may comprise a cylindrical channel extending laterally along at least a portion of a width of the connector element 200 about a second interface axis 221*a* thereof. In various embodiments, as illustrated, the second safety device interface 221 may be defined at least in part by a portion of a surface of the base portion. For example, in various embodiments, the second safety device interface 221 may be at least substantially separated from the first safety device interface 210. In various embodiments, a second safety device interface 221 may be configured for operatively attaching a second safety device, such as, for example, a D-ring, to the connector element 200 and/or the backplate.

As illustrated in the exemplary embodiment shown at FIGS. 4A-4B, wherein the connector element 200 comprises a second safety device interface 221 comprising a hollow interface channel defined by an interior surface diameter and a second interface axis 221*a* extending along a width of the connector element 200 between opposing first and second lateral sides thereof, the second safety device interface 221 may facilitate a coupling of the second safety device to the backplate based on at least a portion of the second safety device, such as, for example, an attachment portion of the second safety device, being received and/or secured within the second safety device interface 221. In various embodiments, a second safety device interface 221 may be defined at least in part by an interior surface diameter that is specifically dimensioned such that the second safety device interface 221 may accommodate each of a variety of distinctly dimensioned second safety devices (e.g., attachment portions of distinctly dimensioned D-rings). In various embodiments, the second safety device interface 221 may comprise an interior surface diameter that is at least substantially between 0.40 inches and 0.60 inches (e.g., between 0.49 inches and 0.52 inches).

The connector element 200 may retain the second safety device in an installed configuration by at least partially restricting the range of motion of the portion of the second safety device disposed within the second safety device interface 220 (e.g., an attachment portion) in one or more directions. For example, in various embodiments wherein a second safety device comprising a D-ring defines an installed configuration such that at least a portion of the D-ring is provided within the second safety device interface 221, the connector element 200 may be configured such that the D-ring may exhibit a rotational range of motion about a central axis of the D-ring attachment portion retained within the second safety device interface 221 (e.g., about the second interface axis 221*a* of the second safety device interface 221). As illustrated, in various embodiments, the second safety device interface 221 may be positioned about the connector element 200 at least substantially adjacent the base portion of the backplate, such that the second interface axis 221*a* of the second safety device interface 221 is positioned a perpendicular distance (e.g., as measured in a direction parallel to the thickness of the base portion) away from the first interface axis 210*a* of the first safety device interface 210. As described herein, the connector element 200 may facilitate the attachment of a first safety device and a second safety device relative to a backplate of a wearable safety harness at least substantially the same time by receiving at least a portion of the first and second safety devices within the first safety device interface 210 and the second safety device interface 221, respectively. As a non-limiting example, the connector element 200 may be configured to at least substantially secure a first safety device comprising a PFL and a second safety device comprising a D-ring relative to the backplate using the first safety device interface 210 and the second safety device interface 221, respectively.

In various embodiments, a connector element 200 comprising a plurality of connection features may further include a third safety device interface 222 operable to secure a third safety device relative to the connector element 200. In various embodiments, third safety device interface 222 may be defined by a configuration that is at least substantially similar to that of the second safety device interface 221, as described herein, comprising a cylindrical channel extending laterally along at least a portion of a width of the connector element 200 about a third interface axis 222*a* thereof. In various embodiments, the third safety device interface 222 may be arranged in an at least substantially parallel configuration relative to the second safety device interface 221, wherein the second safety device interface 221 is positioned about a first longitudinal side of the connector element 200 and the third safety device interface 222 is positioned about a second longitudinal side of the connector element 200, such that the central axes of the second and third safety device interfaces 221, 222 are separated a longitudinal distance apart from one another. In various embodiments, the third safety device interface 222 may be configured for operatively attaching a third safety device, such as, for example, a D-ring, to the connector element 200 and/or the backplate. In various embodiments, the third safety device interface 222 may comprise an interior surface diameter that may be either at least substantially the same or, alternatively, different than that of the second safety device interface 221. For example, in various embodiments, the third safety device interface 222 may comprise an interior surface diameter that is at least substantially between 0.45 inches and 0.60 inches (e.g., between 0.49 inches and 0.52 inches). As described herein, the connector element 200 may facilitate the attachment of a first safety device, a second safety device, and a third safety device relative to a backplate of a wearable safety harness at least substantially the same time by receiving at least a portion of the first, second, and third safety devices within the first safety device interface 210, the second safety device interface 221, and the third safety device interface 222 respectively. As a non-limiting example, the connector element 200 may be configured to at least substantially secure a first safety device comprising a PFL, a second safety device comprising a D-ring, and a third safety device comprising a D-ring relative to the backplate using the first safety device interface 210, the second safety device interface 221, and the third safety device interface 222 respectively.

In various embodiments, a connector element 200 may further comprise a plurality of D-ring retention features 240 disposed at least substantially adjacent the second safety device interface 221 and/or the third safety device interface 222 about a first lateral side and a second lateral side of the connector element 200. In various embodiments, D-ring retention features 240 may comprise an opening, notch, slot, any similar material recess and/or the like configured to extend into one of the second safety device interface 221 or the third safety device interface 222 at the opposing lateral ends of the interface. For example, as illustrated in FIGS. 4A-4D, a plurality of D-ring retention features 240 positioned about the connector element 200 may comprise first D-ring retention features 241*a*, 241*b* disposed at least substantially adjacent the first and second lateral ends of the second safety device interface 221, and second D-ring retention features 242*a*, 242*b* disposed at least substantially adjacent the first and second lateral ends of the third safety device interface 222.

In various embodiments, the D-ring retention features 240 of the connector element 200 may be configured such that, in an exemplary circumstance wherein a second safety device comprising a D-ring is operatively attached to the connector element 200 via the second safety device interface 221, opposing lateral ends of an attachment portion of the D-ring arranged in an installed configuration may each extend through a respective one of the D-ring retention feature 240 (e.g., through first D-ring retention features 241*a*, 241*b*, respectively). Further, in an exemplary circumstance wherein a third safety device comprising a D-ring is operatively attached to the connector element 200 via the third safety device interface 222, opposing lateral ends of an attachment portion of the D-ring arranged in an installed configuration may each extend through a respective one of the D-ring retention features 240 (e.g., through second D-ring retention features 242*a*, 242*b*, respectively). In various embodiments, each of the plurality of D-ring retention features 240 may be engaged by an adjacent portion of a D-ring extending therethrough such that each D-ring retention feature 240 may apply a pressing force on the respective adjacent D-ring portion engaged therewith. In various embodiments, each of the D-ring retention features 240 may be configured to apply a pressing force on the respective adjacent D-ring portion engaged therewith such that the D-ring arranged in an installed configuration relative to the connector element 200 may be retained in an at least substantially upright position in which the D-ring extends in an outward direction away from the connector element 200 within a plane that is at least substantially parallel to the base portion to which the connector element 200 is secured. As an illustrative example, first D-ring retention features 241*a*, 241*b* may apply respective pressing forces in opposing laterally outward directions to the adjacent portions of the opposing arms of a D-ring secured relative to the second safety device interface 221. In various embodiments, the pressing forces applied to the D-ring by the first D-ring retention features 241*a*, 241*b* may be sufficient so as to resist one or more forces that may cause a rotational movement of the D-ring away from a substantially upright position. As such, the plurality of D-ring retention features 240 are configured to maintain the upright position of a D-ring coupled to the connector element 200 throughout a D-ring's exposure to various external forces during operation of the present invention. In various embodiments, the magnitude of the pressing force applied to a D-ring by the D-ring retention features 240 may be sufficiently small so as to enable a manual reconfiguration of the D-ring away from the upright position by a user deliberately applying a force directly thereto. In various embodiments, the magnitude of a pressing force applied by a D-ring retention feature 240 to an adjacent portion of a D-ring may be at least substantially between 30 lbf and 220 lbf (e.g., between 33 lbf and 45 lbf).

In various embodiments, a connector element 200 may further comprise an eyelet 250 extending from an exterior surface of the connector element 200 in an outward direction and configured to receive at least a portion of the plurality of straps of a wearable safety harness. For example, as illustrated in FIGS. 4A-4D, eyelet 250 may comprise a material arm provided along a width of the connector element 200 at a distance away (e.g., measured radially) from an adjacent exterior surface of the connector element 200 so as to define an internal eyelet area 251. The eyelet 250 may be configured to receive the at least a portion of the plurality of straps through the internal eyelet area 251 such that the strap portions disposed within the internal eyelet area 251 are positioned between the material arm of the eyelet 250 and the adjacent exterior surface of the connector element 200. In such an exemplary configuration, the eyelet 250 (e.g., the material arm) may embody an abrasion plate configured to act as a physical barrier for the strap portions provided within the eyelet 250 that may intercept various external forces that may otherwise act on the strap portions to cause abrasion, ripping, tearing, and/or other similar physical damage that may result in a failure condition.

Figure 5A:
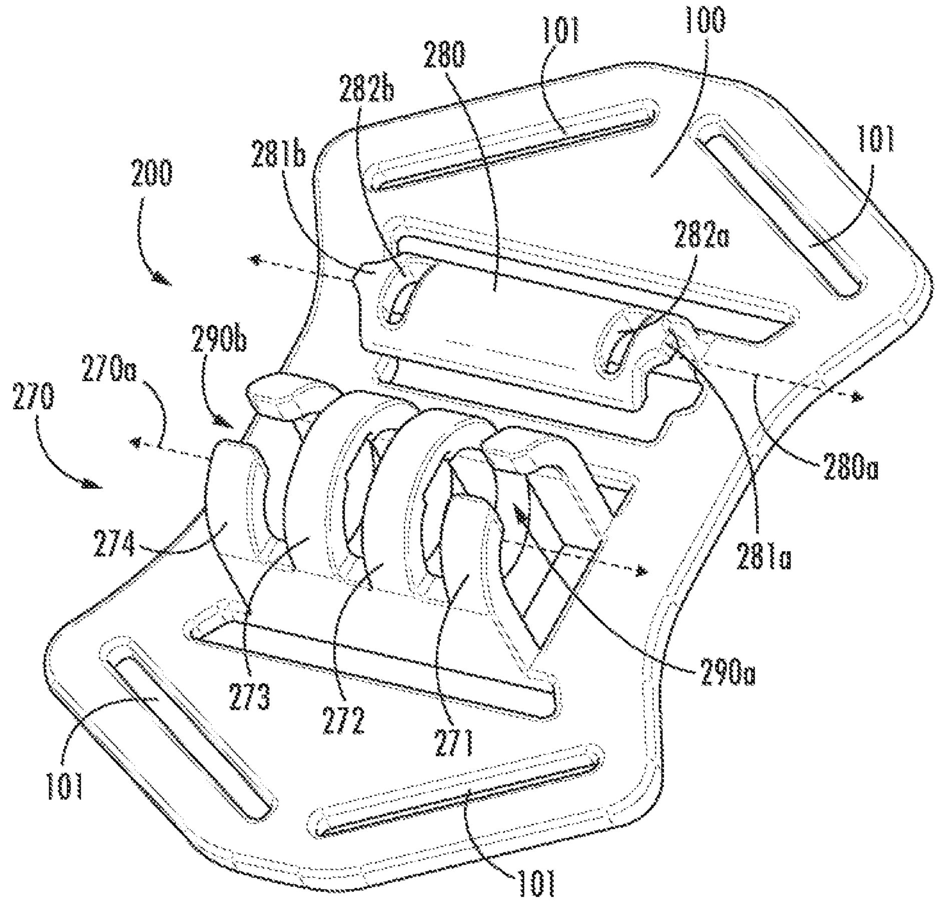
FIGS. 5A-5B illustrate various views of exemplary backplate according to an example embodiment described herein.
Figure 5B:
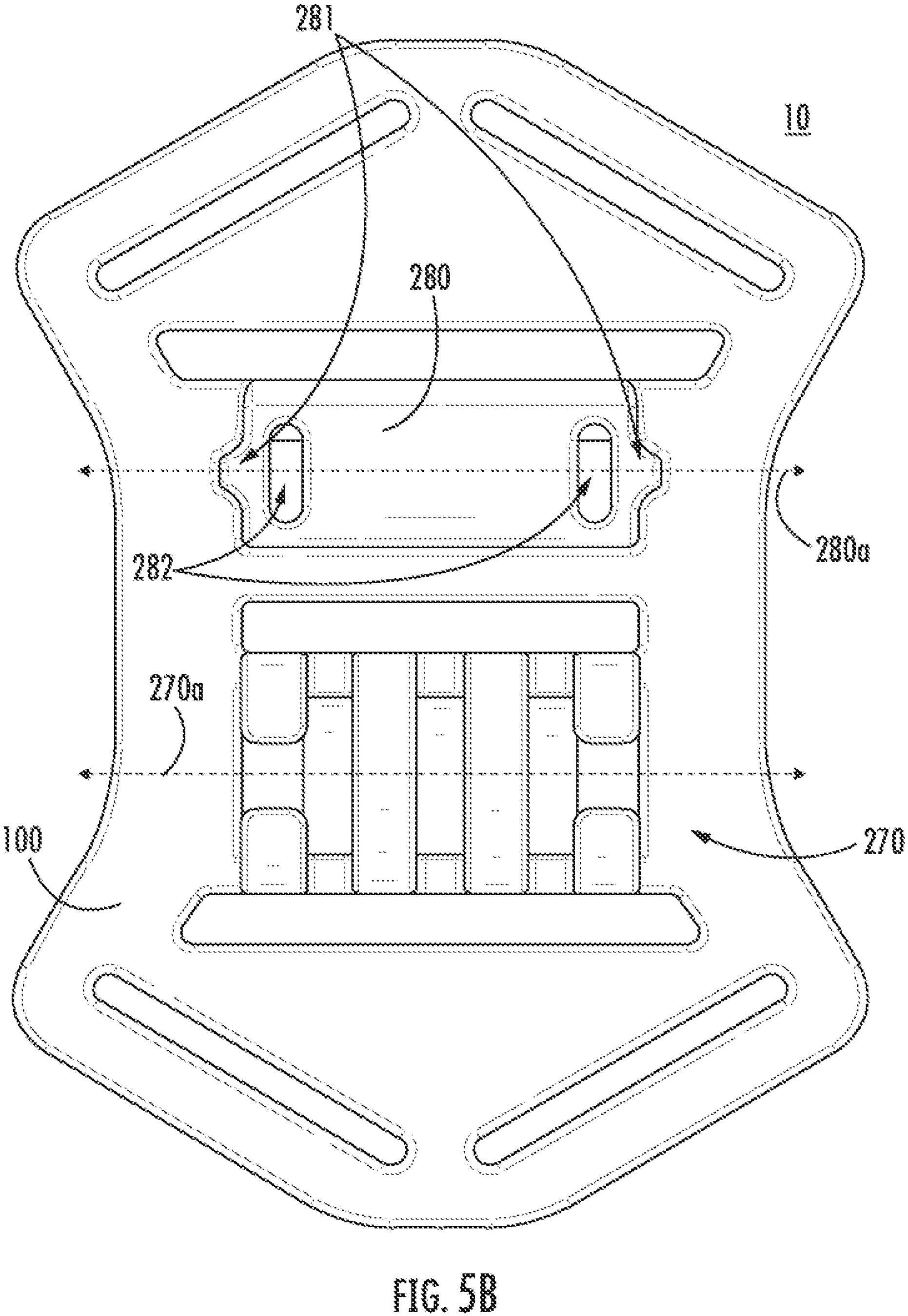

FIGS. 5A and 5B illustrate various views of an exemplary backplate according to various embodiments described herein. In particular, FIG. 5A illustrates a perspective view of an exemplary backplate according to an example embodiment described herein, and FIG. 5B illustrates a front view of an exemplary backplate according to an example embodiment described herein. As illustrated, the exemplary backplate 10 is operable to secure a plurality of safety devices relative to a wearable safety harness. As illustrated, an exemplary backplate 10 may comprise a base portion 100 operable to attach to at least a portion of a wearable safety harness, such as, for example, via a secured arrangement of at least one of the plurality of straps to the base portion 100 through one or more of the base openings 101 extending through the thickness of the base portion 100. For example, an example base portion 100 may comprise a plurality of base openings 101, each of which may be configured to receive at least a portion of a strap therethrough.

In various embodiments, as illustrated, an exemplary backplate 10 may comprise a connector element 200 defined by one or more connection features fixedly secured relative to the base portion. In various embodiments, an exemplary backplate 10 may be configured to receive and/or engage a plurality of safety devices using a plurality of connection features of the connector element 200 fixedly secured relative to the base portion of the backplate 100. For example, as illustrated in FIGS. 5A-5B, the connector element 200 comprises a plurality of connection features defining a first safety device interface 270 configured to engage a first safety device so as to operatively couple the first safety device to the backplate, and a second safety device interface 280 configured to engage a second safety device so as to operatively couple the second safety device to the backplate. The first safety device interface 270 may extend laterally about the base portion 100 along first interface axis 270*a*. In various embodiments, as illustrated in FIGS. 5A-5B, the first safety device interface 270 may comprise a plurality of protrusion features 271, 272, 273, 274 spaced a lateral distance apart from one another and extending in a substantially outward direction away from the base portion 100. As shown, the plurality of protrusion features 271, 272, 273, 274 of the first safety device interface 270 may collectively embody a hollow interface channel provided within the plurality of protrusion features 271, 272, 273, 274 and extending along the first interface axis 270*a*. For example, the hollow interface channel may be defined by a collective of a plurality of orifices extending through coaxial central portions of each of the protrusion features 271, 272, 273, 274. As described herein, the hollow interface channel of the first safety device interface 270 may extend along a width of the connector element 270 between opposing first and second lateral sides thereof.

Similar to the exemplary first safety device interface 210 of the connector element 200 illustrated in FIGS. 4A-4D, first safety device interface 270 may be defined at least in part by one or more interior surface diameters may be specifically dimensioned such that the first safety device interface 270 may accommodate each of a variety of distinctly configured and/or dimensioned first safety devices (e.g., attachment portions thereof). In various embodiments, the first safety device interface 270 may comprise a collective interior surface diameter defined by at least a portion of the individual interior surface diameters of the respective protrusion features 271, 272, 273, 274, which may be at least substantially between 0.75 inches and 1.00 inches (e.g., between 0.82 inches and 0.93 inches). As such, the first safety device interface 270 of the connector element 200 is operable to receive first safety devices having an attachment portion defined by one of a plurality of industry-standard fastening means, such as, for example, a G2 connector, a G3 connector, an LE Turbolite connector, and/or the like.

In various embodiments, connector element 200 may further comprise one or more attachment arm recesses (e.g., first attachment arm recess 290*a*, second attachment arm recess 290*b*) disposed at least substantially adjacent the first safety device interface 270 about a first lateral side and/or a second lateral side of the connector element 200. In various embodiments, the one or more attachment arm recesses may comprise a first attachment arm recess 290*a* and a second attachment arm recess 290*b*, each comprising an at least substantially similar configuration to the one or more attachment arm recesses 230 described above in reference to FIGS. 4A-4D. As illustrated in FIGS. 5A-5B, connector element 200 may further comprise a plurality of attachment arm recesses 290*a*, 290*b* disposed at least substantially adjacent the first safety device interface 270, including a first attachment arm recess 290*a* embodying a slot extending through at least a portion of a first protrusion feature 271 and a second attachment arm recess 290*b* embodying a slot extending through at least a portion of a fourth protrusion feature 274.

As illustrated, a connector element 200 may comprise a second safety device interface 280 defined by an at least substantially tubular channel extending laterally along at least a portion of a width of the connector element 200 about a second interface axis 280*a*. In various embodiments, the second safety device interface 280 may be defined at least in part by one or more connection features extending in an at least substantially outward direction from a surface of the base portion 100. In various embodiments, the second safety device interface 280 may be at least substantially separated a longitudinal distance apart from the first safety device interface 270. In various embodiments, a second safety device interface 280 may be configured for operatively attaching a second safety device, such as, for example, a D-ring, to the connector element 200 and/or the backplate. For example, as illustrated, the second safety device interface 280 may comprise a hollow interior channel defined at least in part by an interior surface configured to engage at least a portion of a second safety device provided within the hollow interior channel (e.g., an attachment portion) so as to at least partially restrict a range of relative motion between the second safety device and the base portion 100.

In various embodiments, a connector element 200 may further comprise a plurality of D-ring retention features 281*a*, 281*b* disposed at least substantially adjacent the second safety device interface 280 about a first lateral side and a second lateral side of the connector element 200. In various embodiments, D-ring retention features 281*a*, 281*b* may comprise protrusions extending from opposing lateral ends of the second safety device interface 280 in respective outward lateral directions For example, as illustrated in FIGS. 5A-5B, a plurality of D-ring retention features 281*a*, 281*b* positioned about the second safety device interface 280 may comprise a first D-ring retention feature 281*a* and a second D-ring retention feature 281*b* disposed at least substantially adjacent the first and second lateral ends of the second safety device interface 280, respectively. As described herein, each of the plurality of D-ring retention features 281*a*, 281*b* may be engaged by an adjacent portion of a D-ring engaged within the second safety device interface 280 such that each D-ring retention feature 281*a*, 281*b* may apply a pressing force on the respective adjacent D-ring portion engaged therewith. In various embodiments, each of the D-ring retention features 281*a*, 281*b* may be configured to apply a pressing force on the respective adjacent D-ring portion engaged therewith such that the D-ring arranged in an installed configuration relative to the second safety device interface 280 may be retained in an at least substantially upright position. As an illustrative example, D-ring retention features 281*a*, 281*b* may apply respective pressing forces in opposing laterally outward directions to the adjacent portions of the opposing arms of a D-ring secured relative to the second safety device interface 280. In various embodiments, the pressing forces applied to the D-ring by the D-ring retention features 281*a*, 281*b* may be sufficient so as to resist one or more forces that may cause a rotational movement of the D-ring away from a substantially upright position.

Further, in various embodiments, the connector element 200 may include one or more apertures (e.g., first aperture 282*a*, second aperture 282*b*) provided about the second safety device interface 280 that may have an at least partially compressible configuration so as to facilitate an at least partially flexible configuration of the second safety device interface 280. For example, in various embodiments, an at least partially flexible configuration of the second safety device interface 280 may be defined by a range of relative lateral motion between a first interface portion and a second interface portion of the second safety device interface 280. In various embodiments, the one or more apertures may comprise a plurality of apertures 282*a*, 282*b* extending between an exterior (e.g., outermost) surface of the second safety device interface 280 and the hollow interior channel provided therein. In various embodiments, the second safety device interface 280 may be configured such that one or both of the first aperture 282*a* and the second aperture 282*b* may be at least partially compressed in a lateral direction in response to one or more lateral forces acting on the second safety device interface 280 as a result of a physical engagement between the D-ring defining an installed configuration relative to the second safety device interface portion 280 and one or both of the D-ring retention features 281*a*, 281*b*.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A backplate for use with a wearable safety harness, the backplate comprising:

a base portion operable to attach to one or more straps of the wearable safety harness; and a connector element comprising a first safety device interface including a cylindrical channel having a cylindrical side wall extending from a first lateral side to a second lateral side of the cylindrical channel and configured to engage a first safety device so as to operatively couple the first safety device to the backplate;

wherein the connector element is selectably detachable from the base portion; and wherein the first safety device interface further comprises a first arm recess extending into the cylindrical side wall from the first lateral side toward the second lateral side and configured such that at least part of an attachment portion of the first safety device extends from the first safety device interface through the first arm recess, when the first safety device defines an installed configuration relative to the first safety device interface.

2. The backplate of claim 1, wherein the connector element further comprises a second safety device interface configured to engage a second safety device so as to operatively couple the second safety device to the backplate, wherein the first safety device comprises one of a fall protection lanyard, a self-retracting lifeline, a personal fall limiter, and a carabiner, and wherein the second safety device comprises a D-ring.

3. The backplate of claim 1, wherein the first arm recess extends at least partially between the first lateral side and the second lateral side of the cylindrical channel.

4. The backplate of claim 2, wherein the cylindrical channel is a first hollow channel configured to receive at least a portion of the first safety device therein so as to at least partially secure the first safety device relative to the connector element; and wherein the second safety device interface comprises a second hollow channel configured to receive at least a portion of the second safety device therein so as to at least partially secure the second safety device relative to the connector element.

5. The backplate of claim 2, wherein the first safety device interface extends laterally along a first width portion of the connector element; and wherein the second safety device interface extends laterally along a second width portion of the connector element.

6. The backplate of claim 2, wherein the connector element further comprises one or more retention features disposed at least substantially adjacent the second safety device interface and configured to apply a pressing force to at least part of the second safety device when the second safety device defines an installed configuration relative to the second safety device interface, wherein the applied pressing force is configured to at least partially counteract one or more external forces so as to maintain the second safety device in an at least substantially upright position.

7. The backplate of claim 1, wherein the first safety device interface is operable to engage a plurality of first safety devices so as to facilitate attachment of each of the plurality of first safety devices relative to the connector element via a corresponding plurality of sequential attachment operations; the plurality of first safety devices being defined by a plurality of respective attachment portions having a plurality of distinct dimensional configurations.

8. The backplate of claim 7, wherein the plurality of respective attachment portions that the first safety device interface is operable to engage includes one or more of a G2 connector, a G3 connector, and an LE Turbolite connector.

9. The backplate of claim 1, wherein the first safety device interface further comprises a second arm recess about the second lateral side and configured such that at least part of the attachment portion of the first safety device extends from the first safety device interface through the first arm recess and the second arm recess when the first safety device defines an installed configuration relative to the first safety device interface.

10. The backplate of claim 1, wherein the connector element further comprises a third safety device interface configured to engage a third safety device so as to operatively couple the third safety device to the backplate.

11. The backplate of claim 1, wherein the connector element further comprises an eyelet extending from an exterior surface of the connector element in an outward direction and configured to receive at least a portion of the one or more straps of the wearable safety harness within an interior eyelet area.

12. The backplate of claim 11, wherein the first safety device interface extends along a central axis that is positioned between the base portion and the eyelet.

13. The backplate of claim 1 wherein the connector element further comprises a second safety device interface extending from the first lateral side to the second lateral side of the connector element.

14. The backplate of claim 13, wherein the first safety device interface defines a first safety device axis, and wherein the second safety device interface defines a second safety device interface axis that is parallel with the first safety device interface axis.

15. A backplate for use with a wearable safety harness, the backplate comprising:

a base portion operable to attach to one or more straps of the wearable safety harness; and a connector element selectably removable from the base portion, the connector element comprising:

a substantially cylindrical first safety device interface including a cylindrical side wall extending from a first lateral side to a second lateral side of the connector element and defining a first safety device interface axis;

a substantially cylindrical second safety device interface extending from the first lateral side to the second lateral side of the connector element and defining a second safety device interface axis that is parallel with the first safety device interface axis;

wherein the first safety device interface further comprises a first arm recess extending through the cylindrical side wall at the first lateral side and configured such that at least part of an attachment portion of a first safety device extends from the first safety device interface through the first arm recess, when the first safety device defines an installed configuration relative to the first safety device interface.

16. The backplate of claim 15, wherein the first safety device interface further comprises a second arm recess about the second lateral side and configured such that at least part of the attachment portion of the first safety device extends from the first safety device interface through the first arm recess and the second arm recess when the first safety device defines an installed configuration relative to the first safety device interface.

* * * * *